(12) United States Patent
Li et al.

(10) Patent No.: US 10,895,942 B2
(45) Date of Patent: Jan. 19, 2021

(54) WRITING DISPLAY SYSTEM, METHOD AND APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Wenbo Li, Beijing (CN); Zhihong Du, Beijing (CN)

(73) Assignees: Beijing BOE Technology Development Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/536,778

(22) Filed: Aug. 9, 2019

(65) Prior Publication Data
US 2020/0333915 A1  Oct. 22, 2020

(30) Foreign Application Priority Data
Apr. 16, 2019 (CN) .......................... 2019 1 0303304

(51) Int. Cl.
G06F 3/044 (2006.01)
G06F 3/0354 (2013.01)
G06F 3/046 (2006.01)

(52) U.S. Cl.
CPC ........ *G06F 3/0442* (2019.05); *G06F 3/03545* (2013.01); *G06F 3/046* (2013.01)

(58) Field of Classification Search
CPC ..... G06F 3/046; G06F 3/0442; G06F 3/03545
See application file for complete search history.

(56) References Cited

U.S. PATENT DOCUMENTS

| | | | |
|---|---|---|---|
| 2015/0338968 A1* | 11/2015 | Yao | G06F 3/03545 345/174 |
| 2017/0097696 A1* | 4/2017 | Park | G06F 3/0383 |
| 2018/0067913 A1* | 3/2018 | Takesue | G06F 40/106 |
| 2018/0074623 A1* | 3/2018 | Xi | G06F 3/0412 |
| 2019/0187856 A1* | 6/2019 | Bruwer | G06F 3/03547 |

* cited by examiner

*Primary Examiner* — Muhammad N Edun
(74) *Attorney, Agent, or Firm* — The Webb Law Firm

(57) ABSTRACT

The present disclosure provides a writing display system, method and apparatus, wherein the writing display system comprises: an electromagnetic pen; an inductive plate configured to induce a moving trajectory of the electromagnetic pen on the inductive plate to acquire writing information; and a display terminal in communication with the inductive plate, configured to display the writing information.

11 Claims, 7 Drawing Sheets emitting, by the inductive plate, a first electromagnetic signal to an electromagnetic pen, wherein the electromagnetic pen generates a power supply current based on the first electromagnetic signal and emits a second electromagnetic signal — 101 receiving, by the inductive plate, the second electromagnetic signal emitted by the electromagnetic pen — 102 positioning, by the inductive plate, the electromagnetic pen based on the second electromagnetic signal to acquire an inductive position of the electromagnetic pen — 103 generating, by the inductive plate, based on the inductive position of the electromagnetic pen, a moving trajectory of the electromagnetic pen on the inductive plate to acquire writing information — 104 transmitting, by the inductive plate, the writing information to a display terminal — 105

WRITING DISPLAY SYSTEM, METHOD AND APPARATUS

CROSS REFERENCE TO RELATED APPLICATIONS

This application claims priority to Chinese Patent Application No. 201910303304.8, as filed on Apr. 16, 2019, the disclosure of which is incorporated herein in its entirety by reference.

TECHNICAL FIELD

The present disclosure relates to a writing display system, method and apparatus.

BACKGROUND

Nowadays, a user may write a content directly on paper, or the user may write the content on a display terminal. For example, the user may manually write the content directly on the display terminal. Further, in a conference, speech, or classroom teaching, a primary speaker may draw a laser signal on the display terminal by using a laser pen to write the content to be explained.

However, the content written on the paper is easily damaged or missing due to the environment or other factors, while writing the content on the display terminal lacks reality.

SUMMARY

An embodiment of a first aspect of the present disclosure provides a writing display system comprising:
an electromagnetic pen;
an inductive plate configured to induce a moving trajectory of the electromagnetic pen on the inductive plate to acquire writing information; and
a display terminal in communication with the inductive plate, configured to display the writing information.

An embodiment of a second aspect of the present disclosure provides a writing display method applied to an inductive plate, the writing display method comprising:
emitting, by the inductive plate, a first electromagnetic signal to an electromagnetic pen, wherein the electromagnetic pen generates a power supply current based on the first electromagnetic signal and emits a second electromagnetic signal;
receiving, by the inductive plate, the second electromagnetic signal emitted by the electromagnetic pen;
positioning, by the inductive plate, the electromagnetic pen based on the second electromagnetic signal to acquire an inductive position of the electromagnetic pen;
generating, by the inductive plate, based on the inductive position of the electromagnetic pen, a moving trajectory of the electromagnetic pen on the inductive plate to acquire writing information; and
transmitting, by the inductive plate, the writing information to a display terminal.

An embodiment of a third aspect of the present disclosure provides a writing display apparatus comprising:
a emitting circuit configured to emit a first electromagnetic signal to an electromagnetic pen, wherein the electromagnetic pen generates a power supply current based on the first electromagnetic signal and emits a second electromagnetic signal;
a receiving circuit configured to receive the second electromagnetic signal emitted by the electromagnetic pen;
a positioning circuit configured to position the electromagnetic pen based on the second electromagnetic signal to acquire an inductive position of the electromagnetic pen;
a generating circuit configured to generate, based on the inductive position of the electromagnetic pen, a moving trajectory of the electromagnetic pen on the inductive plate to acquire writing information; and
a transmitting circuit configured to transmit the writing information to a display terminal.

An embodiment of a fourth aspect of the present disclosure provides a computer readable storage medium on which a computer program is stored, wherein the program, when executed by a processor, implements the writing display method applied to an inductive plate as provided in the embodiment of the first aspect of the present disclosure.

BRIEF DESCRIPTION OF THE DRAWINGS

The aforementioned and/or additional aspects and advantages of the present disclosure will become apparent and easily comprehensive in the following description for the embodiments in combination with the drawings, wherein.

DETAILED DESCRIPTION

Figure 1:
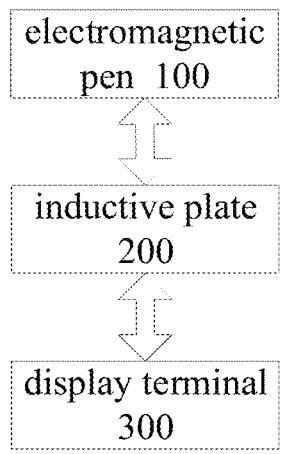
FIG. 1 is a structural diagram of the writing display system as provided in embodiment 1 of the present disclosure.

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the accompanying drawings are illustrative and are intended to explain the present disclosure, and are not to be construed as limiting on the present disclosure.

The present disclosure provides a writing display system, method, and apparatus. A user may write content on a real inductive plate by using an electromagnetic pen, and display, in real time, the written content on the display terminal, which may enhance reality of content writing, enhance the user's usage viscosity, and improve the user's usage experience, for addressing the technical problem of the lack of reality in writing content on the display terminal in the prior art.

The writing display system of the embodiments of the present disclosure uses an inductive plate to induce a moving trajectory of the electromagnetic pen on the inductive plate to acquire writing information, and transmits the writing information to a display terminal to display the writing information. Thus, the user may write the content on the real inductive plate by using the electromagnetic pen, and display, in real time, the written content by using the display terminal, which may enhance the reality of the content writing, enhance the user's usage viscosity, and improve the user's usage experience.

The writing display method of the embodiments of the present disclosure comprises emitting, by the inductive plate, the first electromagnetic signal to the electromagnetic pen, receiving the second electromagnetic signal emitted from the electromagnetic pen, positioning the electromagnetic pen based on the second electromagnetic signal to acquire the inductive position of the electromagnetic pen, and then generating, based on the inductive position of the electromagnetic pen, the moving trajectory of the electromagnetic pen on the inductive plate to acquire the writing information. Thus, according to the electromagnetic induction principles, the inductive position of the electromagnetic pen may be accurately recognized such that the accuracy of acquisition of the writing information can be enhanced.

The writing display apparatus of the embodiments of the present disclosure transmits the first electromagnetic signal to the electromagnetic pen, receives the second electromagnetic signal emitted from the electromagnetic pen, positions the electromagnetic pen based on the second electromagnetic signal to acquire the inductive position of the electromagnetic pen, and then generates, based on the inductive position of the electromagnet pen, the moving trajectory of the electromagnetic pen on the inductive plate to acquire the writing information. Thus, according to the electromagnetic induction principles, the inductive position of the electromagnetic pen may be accurately recognized such that the accuracy of acquisition of the writing information can be enhanced.

Additional aspects and advantages of the present disclosure will be partially given in the following description, partially become apparent from the following description, or understood through practice of the present disclosure.

With reference to the drawings, the writing display system, method, and apparatus of the embodiments of the present disclosure are described below.

FIG. 1 is a structural diagram of the writing display system as provided in embodiment 1 of the present disclosure.

As shown in FIG. 1, the writing display system comprises an electromagnetic pen 100, an inductive plate 200, and a display terminal 300.

In particular, the inductive plate 200 is configured to induce a moving trajectory of the electromagnetic pen 100 on the inductive plate 200 to acquire writing information.

The display terminal 300 is in communication with the inductive plate 200 for displaying the writing information.

In the embodiments of the present disclosure, the display terminal 300 may be a Personal Computer (briefly referred to as PC), a cloud device, a mobile device, or the like. The mobile device may be, for example, a mobile phone, a tablet PC, a PDA, a wearable device, an in-vehicle device, or other hardware device having various operating systems, touch screens and/or display screens.

In the embodiments of the present disclosure, the inductive plate 200 may be in communication with the display terminal 300 in a wired way. Alternatively, to enhance flexibility and convenience of the user usage, the inductive plate 200 may be in communication with the display terminal 300 in a wireless way such as WiFi, Bluetooth, ZigBee or the like, for which no limit is made.

In the embodiments of the present disclosure, when a writing member, such as a pen tip, of the electromagnetic pen 100 approaches the inductive plate 200 or moves on the inductive plate 200, an electromagnetic induction phenomenon may occur at the inductive plate 200 to generate a uniform magnetic field. A metal inductive coil at the writing member, such as the pen tip, of electromagnetic pen 100 may convert magnetic energy into electric energy through a resonance phenomenon for providing endurance of the electromagnetic pen 100, namely charging the electromagnetic pen 100. In the present disclosure, the electromagnetic pen 100 is passive, and is energized or charged by means of the electromagnetic induction, which may reduce a size, a weight or a volume of the electromagnetic pen 100 and enhance the convenience of the user operation.

Figure 2:
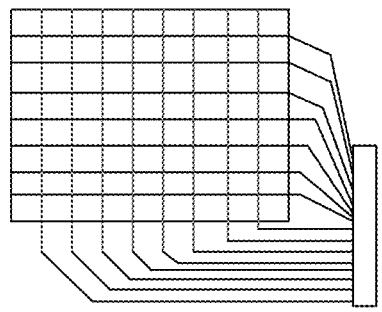
FIG. 2 is a layout diagram of circuit lines in the inductive plate in the embodiments of the present disclosure.
Figure 3:
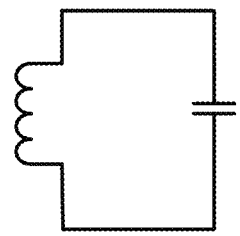
FIG. 3 is a diagram of the micro circuit in the electromagnetic pen in the embodiments of the present disclosure.

As an example, referring to FIG. 2, the inductive plate 200 may be provided with horizontal and vertical lines which are uniformly arranged (or inductive lines) to partition the inductive plate 200 into a certain number of squares. A uniform crossing magnetic field may be generated above the inductive plate 200. Referring to FIG. 3, the electromagnetic pen 100 is provided with a resonant circuit through which the electric energy is accumulated.

In the embodiments of the present disclosure, after the electromagnetic pen 100 is energized, it may emit an electromagnetic signal to the outside. The inductive plate 200 may induce the electromagnetic signal emitted from electromagnetic pen 100, so as to determine an inductive position of the electromagnetic pen 100 based on the electromagnetic signal. For example, after the inductive plate 200 has induced the electromagnetic signal emitted from the electromagnetic pen 100, the inductive lines below the inductive plate 200 may be changed such that a magnetic flux changes. Based on the change in the magnetic flux, a position of the electromagnetic pen 100 with respect to the inductive plate 200 may be calculated, which is referred to as an inductive position in the present disclosure.

In the embodiments of the present disclosure, after the inductive plate 100 determines the inductive position of the electromagnetic pen 100, a moving trajectory of the electromagnetic pen 100 on the inductive plate 200 may be generated based on the inductive position of the electromagnetic pen 100 to acquire writing information. For example, the moving trajectory of the electromagnetic pen 100 on the inductive plate 200 may be determined by continuous coordinates of the inductive position, so as to determine the writing information. After the writing information is determined, the aforementioned writing information may be displayed by using the display terminal 300.

Figure 4:
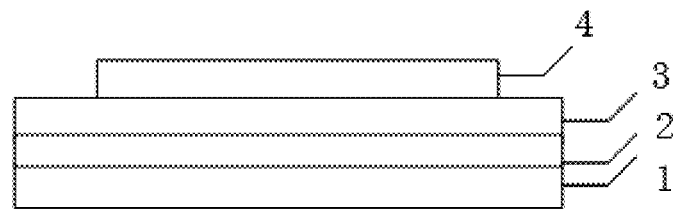
FIG. 4 is a basic structural diagram of the inductive plate in the embodiments of the present disclosure.
Figure 5:
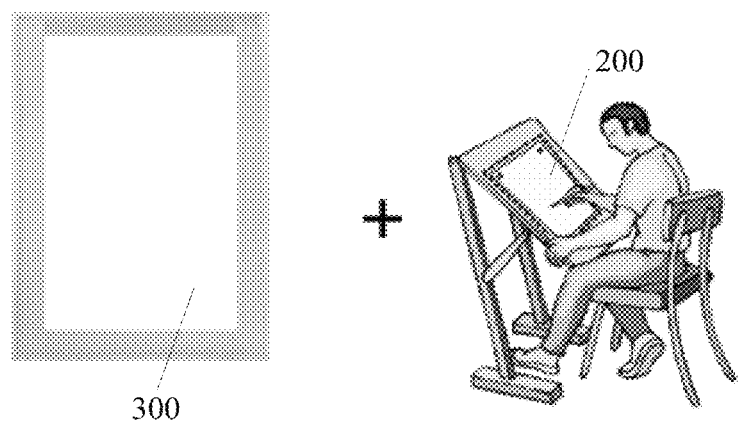
FIG. 5 is diagram 1 of the application scene of the embodiments of the present disclosure.

As an example, a structure of the inductive plate 200 may be as shown in FIG. 4. In particular, the inductive plate includes a first substrate 1, a core member 2, a second substrate 3, and a writable medium 4, wherein the first substrate 1 is located below the core member 2, the second substrate 3 is disposed above the core member 2, and the writable medium 4 is disposed above the second substrate 3. The writable medium 4 includes, but is not limited to, paper, canvas, or the like. Thus, the user writes the content by using the real writable medium 4, which may enhance the reality of the content writing. As an application scene, when it is applied to a teaching scene, referring to FIG. 5, a teacher may write the content, such as perform painting, on a writing medium of the inductive plate 200 by using the electromagnetic pen 100. Then, the content drawn by the teacher may be displayed by using the display terminal 300.

The writing display system of the embodiments of the present disclosure uses the inductive plate to induce the moving trajectory of the electromagnetic pen on the inductive plate to acquire the writing information, and transmits the writing information to the display terminal so as to display the writing information. Thus, the user may write the content on the real inductive plate by using the electromagnetic pen, and display, in real time, the written content by using the display terminal, which may enhance the reality of the content writing, enhance the user's usage viscosity, and improve the user's usage experience.

Figure 6:
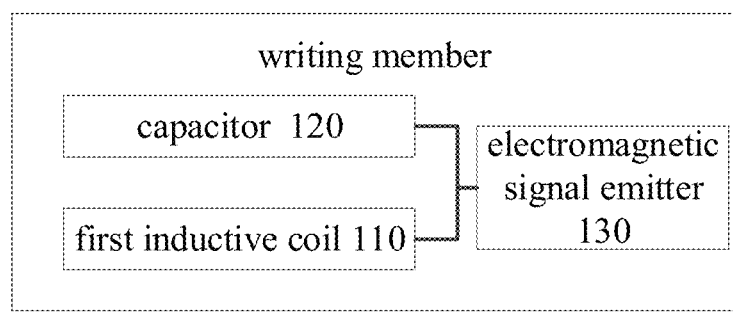
FIG. 6 is a structural diagram of the writing member as provided in embodiment 2 of the present disclosure.

As a possible implementation, the electromagnetic pen 100 may include a writing member and a holding member. For example, the writing member may be a pen tip, and the holding member may be a pen holder. In particular, as shown in FIG. 6, the writing member may include a first inductive coil 110, a capacitor 120 connected to the first inductive coil 110, and an electromagnetic signal emitter 130 connected to the capacitor 120.

In particular, the first inductive coil 110 is configured to generate a power supply current based on the first electromagnetic signal emitted from the inductive plate 200.

In the embodiments of the present disclosure, the electromagnetic pen 100 is passive, and the first inductive coil 110 in the electromagnetic pen 100 may convert the first electromagnetic signal emitted from the inductive plate 200 into the power supply current, so as to supply the power to the electromagnetic pen 100.

Specifically, when the writing member, such as the pen tip, of the electromagnetic pen 100 approaches the inductive plate 200 or moves on the inductive plate 200, an electromagnetic inductive phenomenon may occur at the inductive plate 200, and a uniform magnetic field is generated. The first inductive coil 110 at the writing member, such as the pen tip, of electromagnetic pen 100 may convert the magnetic energy into the electric energy (that is, magnetic to electric). That is, the first inductive coil 110 may induce the first electromagnetic signal emitted from the inductive plate 200, and convert the first electromagnetic signal into a power supply current, so as to charge the electromagnetic pen 100.

The electromagnetic signal transmitter 130 is configured to emit the second electromagnetic signal to the inductive plate 200 after the capacitor 120 has received the power supply current.

In the embodiments of the present disclosure, after the electromagnetic pen 100 is charged, the electromagnetic pen 100 may be discharged by the capacitor 120 and emit an electromagnetic signal to the outside (that is, electric to magnetic). Specifically, when the capacitor 120 discharges to the outside, the electromagnetic signal emitter 130 may be used to emit the second electromagnetic signal to the inductive plate 200. In the embodiments of the present disclosure, the electromagnetic pen 110 further includes a receiving portion for receiving a writing medium material such as ink, lead, paint or the like. The electromagnetic pen 100 may not only generate the electromagnetic induction phenomenon with the inductive plate 200 to generate a magnetic field, but also make handwriting on the writable medium 4 of inductive plate 200, for example, ink handwriting, pencil handwriting or the like. Thus, the user may own the reality as he writes on the general paper, and can display, in real time, the written content on the display terminal, such that the user can obtain both a paper paint and an electronic paint at the same time, thus enhancing the user experience.

The electromagnetic pen 100 of the embodiments of the present disclosure is passive, and is energized or charged by means of the electromagnetic induction, which may reduce a size, a weight, and a volume of the electromagnetic pen 100 and enhance the convenience of the user operation.

Figure 7:
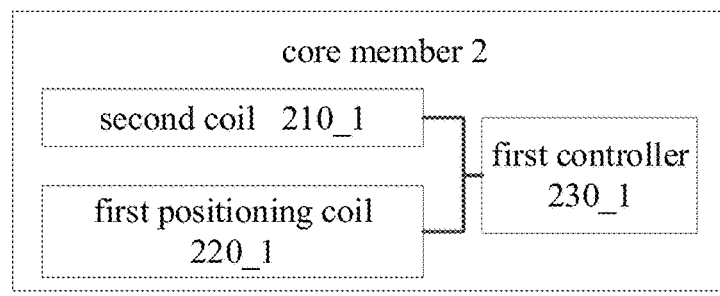
FIG. 7 is a structural diagram of the core member as provided in embodiment 3 of the present disclosure.

As a possible implementation, a structure of the core member 2 may be as shown in FIG. 7. In particular, the core member 2 includes a second coil 210_1, a first positioning coil 220_1 and a first controller 230_1. That is, the second coil 210_1, the first positioning coil 2201, and the first controller 230_1 may be disposed in the core member 2 in FIG. 4.

In particular, the second coil 210_1 is configured to emit a first electromagnetic signal to the first inductive coil 110.

In the embodiments of the present disclosure, the second coil 210_1 includes at least one coil. The power source system in the inductive plate 200 may energize the second coil 210_1, such that the second coil 210_1 may emit the first electromagnetic signal to the first inductive coil 110. Accordingly, upon receipt of the first electromagnetic signal, the first inductive coil 110 may convert the first electromagnetic signal into a power supply current, so as to charge the electromagnetic pen 100. After the electromagnetic pen 100 is charged, it may be discharged by the capacitor 120, and emit the second electromagnetic signal to the outside by the electromagnetic signal emitter 130.

The first positioning coil 220_1 is configured to receive the second electromagnetic signal emitted form the electromagnetic pen, and positioning the electromagnetic pen based on the second electromagnetic signal to acquire an inductive position of the electromagnetic pen.

In the embodiments of the present disclosure, the second coil 210_1 and the first positioning coil 220_1 are coils at different positions. For example, the second coil 210_1 may be located in a peripheral area of the inductive plate 200, and the first positioning coil 2201 may be located in a central area of the inductive plate 200. As an example, referring to FIG. 8, letter A denotes the second coil 210_1, and letter B denotes the first positioning coil 220_1.

In the embodiments of the present disclosure, the first positioning coil 220_1 includes at least one coil. Upon receipt of the second electromagnetic signal, the first positioning coil 220_1 may generate an inductive current, such that an inductive position of the electromagnetic pen 100 may be calculated based on the inductive current generated by the first positioning coil 2201.

The first controller 230_1 is connected to the second coil 210_1 and the first positioning coil 220_1, respectively. The first controller 230_1 controls the second coil 210_1 to emit the first electromagnetic signal, and generate a moving trajectory of the electromagnetic pen 100 on the inductive plate 200 based on the inductive position of the electromagnetic pen 100 so as to acquire the writing information.

In the embodiments of the present disclosure, after the inductive position of the electromagnetic pen 100 is determined, the first controller 2301 may generate a moving trajectory of the electromagnetic pen 100 on the inductive plate 200 based on the inductive position of electromagnetic pen 100, so as to acquire the writing information. For example, the first controller 230_1 may determine the moving trajectory of electromagnetic pen 100 on the inductive plate 200 by using continuous coordinates of the inductive position, so as to determine the writing information. Thus, according to the electromagnetic induction principles, the inductive position of the electromagnetic pen may be accurately recognized such that the accuracy of acquisition of the writing information can be enhanced.

Figure 9:
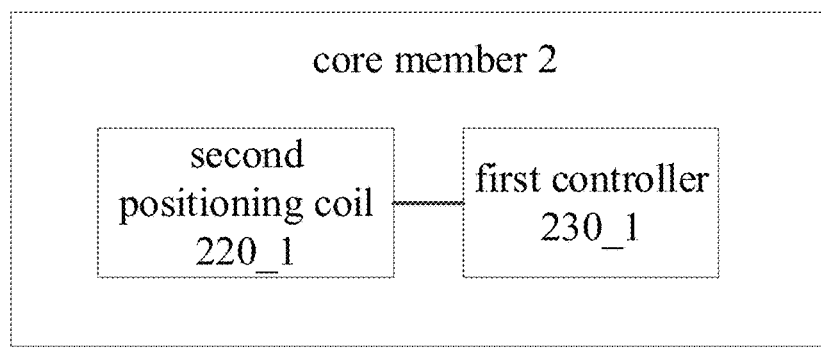
FIG. 9 is a structural diagram of the core member as provided in embodiment 4 of the present disclosure.

It needs to be noted that, the aforementioned FIG. 7 only takes as an example that the second coil 210_1 and the first positioning coil 220_1 are coils at different positions. In practical applications, the second coil 210_1 and the first positioning coil 220_1 may also be the same coil. Specifically, when the second coil 2101 and the first positioning coil 220_1 are the same coil, they may be switched by a switch in a manner of time division. In other words, the second coil 210_1 (or the first positioning coil 220_1) is energized at a first timing to emit a first electromagnetic signal to the first inductive coil 110, and the charging of the second coil 210_1 (or the first positioning coil 2201) is stopped at a second timing so as to receive a second electromagnetic signal emitted from the electromagnetic pen 100. Referring to FIG. 9, the aforementioned process is explained below in detail.

FIG. 9 is a structural diagram of the core member as provided in embodiment 4 of the present disclosure.

As shown in FIG. 9, on the basis of the embodiment as shown in FIG. 4, the core member 2 specifically includes a second positioning coil 210_2 and a second controller 230_2.

In particular, the second positioning coil 2102 is configured to emit a first electromagnetic signal to the first inductive coil 110 at a first timing, receiving a second electromagnetic signal emitted from the electromagnetic pen 100, and positioning the electromagnetic pen 100 based on the second electromagnetic signal to acquire an inductive position of the electromagnetic pen 100.

In the embodiments of the present disclosure, when the second coil 210_1 and the first positioning coil 220_1 are the same coil, they are referred to as the second positioning coil 210_2 in the present disclosure, and they may be switched by a switch in a manner of time division. In other words, the second positioning coil 210_2 is energized at the first timing to emit the first electromagnetic signal to the first inductive coil 110, and the charging of the second positioning coil 210_2 is stopped at the second timing so as to receive the second electromagnetic signal emitted from the electromagnetic pen 100.

In the embodiments of the present disclosure, upon receipt of the second electromagnetic signal, the second positioning coil 210_2 may generate an inductive current, such that an inductive position of the electromagnetic pen 100 may be calculated based on the inductive current generated by the second positioning coil 210_2.

The second controller 230_2 is connected to the second positioning coil 210_2. The second controller 230_2 controls the second positioning coil 210_2 to emit the first electromagnetic signal at the first timing, and generates a moving trajectory of the electromagnetic pen 100 on the inductive plate 200 based on the inductive position of electromagnetic pen 100 to acquire the writing information.

In the embodiments of the present disclosure, after the inductive position of the electromagnetic pen 100 is determined, the second controller 230_2 may generate the moving trajectory of the electromagnetic pen 100 on the inductive plate 200 based on the inductive position of the electromagnetic pen 100 to acquire the writing information. For example, the second controller 230_2 may determine the moving trajectory of the electromagnetic pen 100 on the inductive plate 200 by using continuous coordinates of the inductive position, so as to determine the writing information.

As a possible implementation, on the basis of the embodiment as shown in FIG. 7, the first positioning coil 220_1 may include:

a first coil unit configured to position the electromagnetic pen in a first direction;

a second coil unit located on a different layer from the first coil unit, a direction of coils of the second coil unit being vertical to that of the first coil unit, the second coil unit configured to position the electromagnetic pen in a second direction.

In the embodiments of the present disclosure, a direction in which the first coil unit is disposed is vertical to that in which the second coil unit is disposed. For example, the direction in which the first coil unit is disposed may be the X direction and the direction in which the second coil unit is disposed may be the Y direction. Alternatively, the direction in which the first coil unit is disposed may be the Y direction and the direction in which the second coil unit is disposed may be the X direction.

In the embodiments of the present disclosure, when the inductive plate 200 emits the first electromagnetic signal to the outside, the generated electromagnetic field may generate resonance with a resonant circuit within the electromagnetic pen 100 to convert the magnetic energy into the electric energy. Then, the electromagnetic pen 100 may be discharged to the outside by using the capacitor 120 to emit the second electromagnetic signal. Thus, the first coil unit and the second coil unit which are vertical to each other, for example, the first coil unit in the X direction and the second coil unit in the Y direction, are used to emit the first electromagnetic signal, and the second electromagnetic signal resulting from the resonance of the electromagnetic pen 100 is received to determine the X coordinate and the Y coordinate of the electromagnetic pen 100 on the inductive plate 200, so as to determine the inductive position of the electromagnetic pen 100 on the inductive plate 200, thereby determining the moving trajectory of the electromagnetic pen 100 on the inductive plate 200 by continuous inductive positions, and thus acquiring the writing information.

Also, on the basis of the embodiment as shown in FIG. 9, the second positioning coil 2102 may include the first coil unit and the second coil unit. The principle thereof is similar, and no further comment is given.

Figure 8:
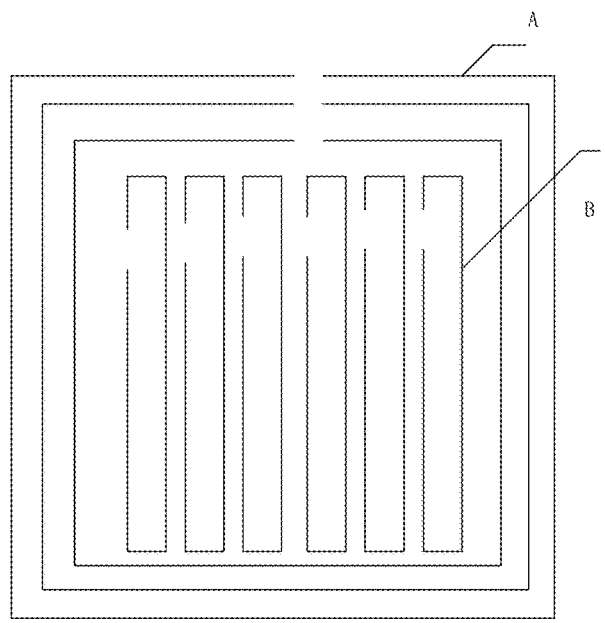
FIG. 8 is diagram 1 of the coil layout in the inductive plate in the embodiments of the present disclosure.
Figure 10:
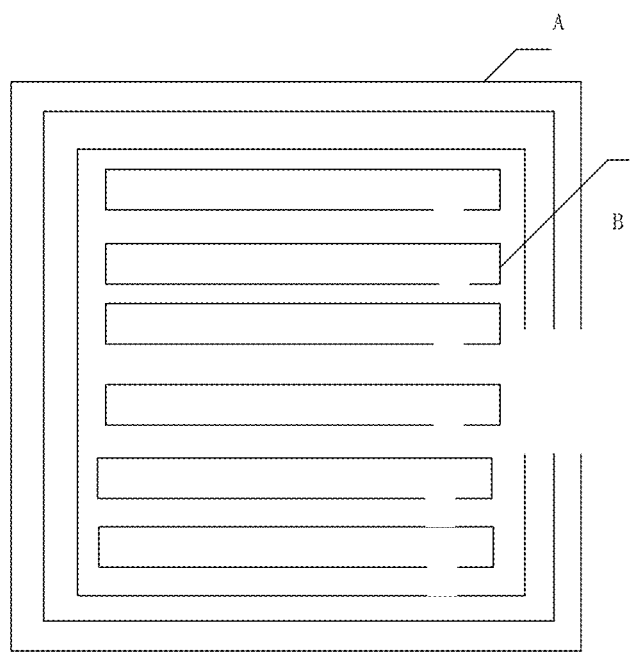
FIG. 10 is diagram 2 of the coil layout in the inductive plate in the embodiments of the present disclosure.

As an example, the first coil unit may be as shown in FIG. 8, and the second coil unit may be as shown in FIG. 10.

Figure 11:
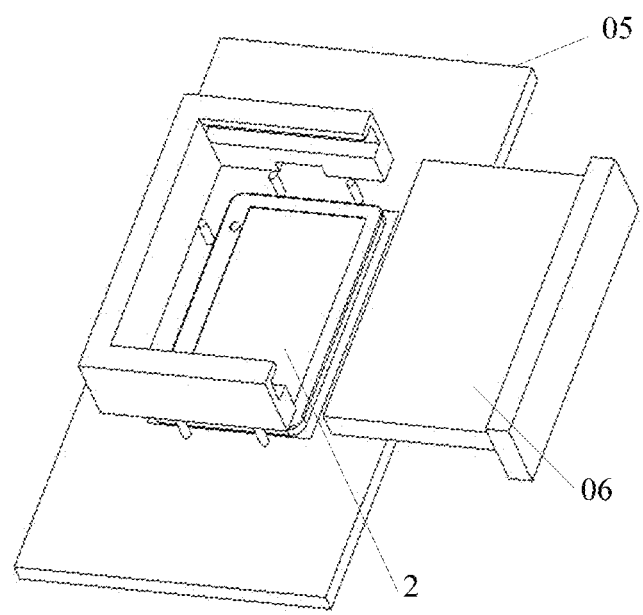
FIG. 11 is diagram 2 of the application scene of the embodiments of the present disclosure.
Figure 12:
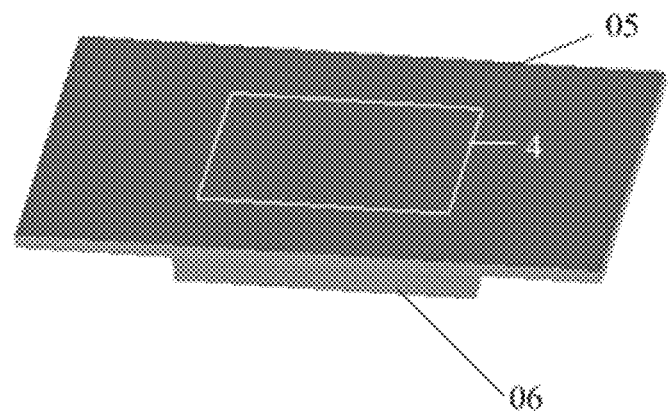
FIG. 12 is diagram 3 of the application scene of the embodiments of the present disclosure.

As an application scene, when the writing display system is applied to teaching, referring to FIG. 11, the core member 2 in the inductive plate 200 may be disposed within a desk body, wherein the reference number "05" denotes a desktop, and the reference number "06" denotes a drawer. Referring to FIG. 12, the writable medium 4 (e.g. paper) in the inductive plate 200 may be disposed on the desktop, such that teachers and students may perform writing on paper in real time and simultaneously display it by using the display apparatus 300.

Figure 13:
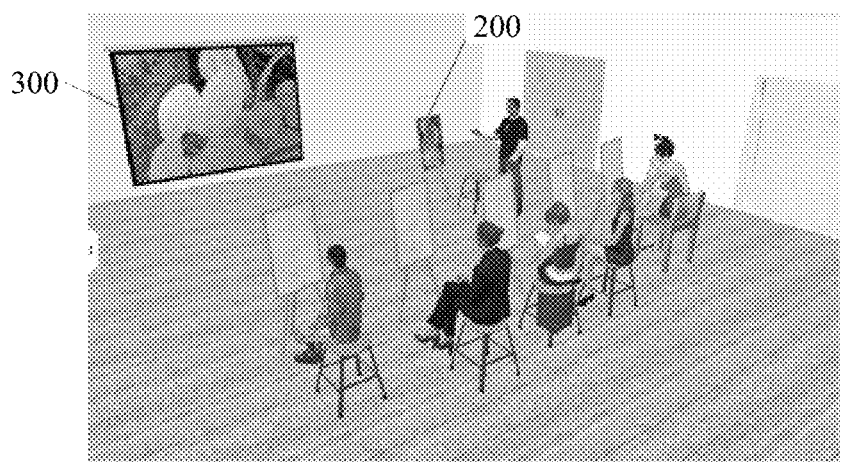
FIG. 13 is diagram 4 of the application scene of the embodiments of the present disclosure.

As an application scene, when the writing display system is applied to teaching, referring to FIG. 13, the inductive plate 200 may be provided in form of a sketchpad. When an art teacher performs painting on a writable medium on the inductive plate 200, it may be simultaneously displayed on the display terminal 300. Thus, the user may write the content on a real writable medium, which may enhance the reality of the content writing and enhance the user's usage experience.

To implement the aforementioned embodiments, the present disclosure further provides a writing display method.

Figure 14:
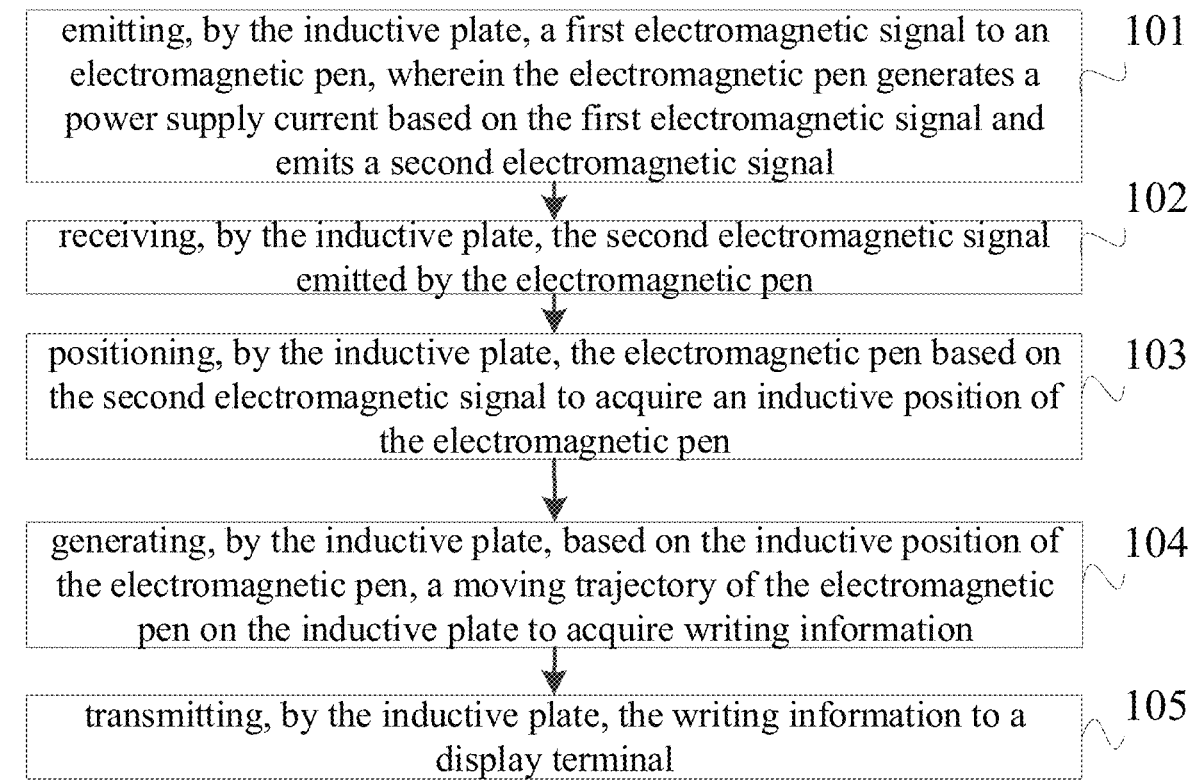
FIG. 14 is a flow diagram of the writing display method as provided in embodiment 5 of the present disclosure.

FIG. 14 is a flow chart of the writing display method as provided in embodiment 5 of the present disclosure.

As shown in FIG. 14, the writing display method may include the following steps.

Step 101, emitting, by the inductive plate, a first electromagnet signal to an electromagnetic pen, wherein the electromagnetic pen generates a power supply current based on the first electromagnetic signal and emits a second electromagnetic signal.

A subject which implements the embodiments of the present disclosure may be the inductive plate.

As a possible implementation, a coil of a core member in the inductive plate may be used to emit the first electromagnetic signal to the electromagnetic pen. Accordingly, upon receipt of the first electromagnetic signal, the electromagnetic pen may convert the first electromagnetic signal into a power supply current (that is, magnetic to electric) so as to charge the electromagnetic pen. After the electromagnetic pen is charged, it may be discharged by a capacitor to emit the second electromagnetic signal to the outside (that is, electric to magnetic).

As another possible implementation, a second positioning coil of the core member in the inductive plate may be used to emit the first electromagnetic signal to the electromagnetic pen at a first timing. Accordingly, upon receipt of the first electromagnetic signal, the electromagnetic pen may convert the first electromagnetic signal into a power supply current (that is, magnetic to electric) to charge the electromagnetic pen. After the electromagnetic pen is charged, it may be discharged by the capacitor to emit the second electromagnetic signal to the outside (that is, electric to magnetic).

Step 102, receiving, by the inductive plate, a second electromagnetic signal emitted from the electromagnetic pen.

As a possible implementation, a first positioning coil of the core member in the inductive plate may be used to receive the second electromagnetic signal emitted from the electromagnetic pen.

As another possible implementation, the second poisoning coil of the core member in the inductive plate may be used to receive the second electromagnetic signal emitted from the electromagnetic pen at a second timing. In other words, in the present disclosure, the inductive plate may energize the second positioning coil at the first timing to emit the first electromagnetic signal to the electromagnetic pen, and stop the charging of the second positioning coil at the second timing so as to receive the second electromagnetic signal emitted from the electromagnetic pen.

Step 103, positioning, by the inductive plate, the electromagnetic pen based on the second electromagnetic signal to acquire an inductive position of the electromagnetic pen.

In the embodiments of the present disclosure, after the core member in the inductive plate has received the second electromagnetic signal, an inductive current may be generated, and thus an inductive position of the electromagnetic pen is calculated based on the inductive current as described above.

As a possible implementation, the first positioning coil and the second positioning coil in step 102 may include a first coil unit and a second coil unit, wherein the first coil unit is configured to position the electromagnetic pen in a first direction; the second coil unit located on a different layer from the first coil unit, a direction of coils of the second coil unit being vertical to that of the first coil unit, and the second coil unit being configured to position the electromagnetic pen in a second direction.

In the embodiments of the present disclosure, a direction in which the first coil unit is disposed is vertical to that in which the second coil unit is disposed. For example, the direction in which the first coil unit is disposed may be the X direction and the direction in which the second coil unit is disposed may be the Y direction. Alternatively, the direction in which the first coil unit is disposed may be the Y direction and the direction in which the second coil unit is disposed may be the X direction.

In the embodiments of the present disclosure, when the inductive plate emits the first electromagnetic signal to the outside, the generated electromagnetic field may generate resonance with a resonant circuit within the electromagnetic pen to convert the magnetic energy into the electric energy. Then, the electromagnetic pen may be discharged to the outside by the capacitor to transmit the second electromagnetic signal. Thus, the first coil unit and the second coil unit which are vertical to each other, for example, the first coil unit in the X direction and the second coil unit in the Y direction, are used to emit the first electromagnetic signal, and the second electromagnetic signal resulting from the resonance of the electromagnetic pen is received to determine the X coordinate and the Y coordinate of the electromagnetic pen on the inductive plate, so as to determine the inductive position of the electromagnetic pen on the inductive plate.

Step 104, generating, by the inductive plate, based on the inductive position of the electromagnetic pen, a moving trajectory of the electromagnetic pen on the inductive plate to acquire writing information.

In the embodiments of the present disclosure, after the inductive position of the electromagnetic pen is determined, the inductive plate may generate, based on the inductive position of the electromagnetic pen, a moving trajectory of the electromagnetic pen on the inductive plate to acquire the writing information. For example, the inductive plate uses continuous coordinates of the inductive position to determine the moving trajectory of the electromagnetic pen on the inductive plate so as to determine the writing information. Thus, according to the electromagnetic induction principles, the inductive position of the electromagnetic pen may be accurately recognized such that the accuracy of acquisition of the writing information can be enhanced.

Step 105, transmitting, by the inductive plate, the writing information to a display terminal.

In the embodiments of the present disclosure, upon determination of the writing information, the inductive plate may transmit the aforementioned writing information to the display terminal to cause the display terminal to display the aforementioned writing information in real time.

The writing display method of the embodiment of the present disclosure comprises emitting the first electromagnetic signal to the electromagnetic pen, receiving the second electromagnetic signal emitted from the electromagnetic pen, positioning the electromagnetic pen based on the second electromagnetic signal to acquire the inductive position of the electromagnetic pen, and then generating, based on the inductive position of the electromagnetic pen, the moving trajectory of the electromagnetic pen on the inductive plate to acquire the writing information. Thus, according to the electromagnetic induction principles, the inductive position of the electromagnetic pen may be accurately recognized such that the accuracy of acquisition of the writing information can be enhanced.

To implement the aforementioned embodiments, the present disclosure provides a writing display apparatus.

Figure 15:
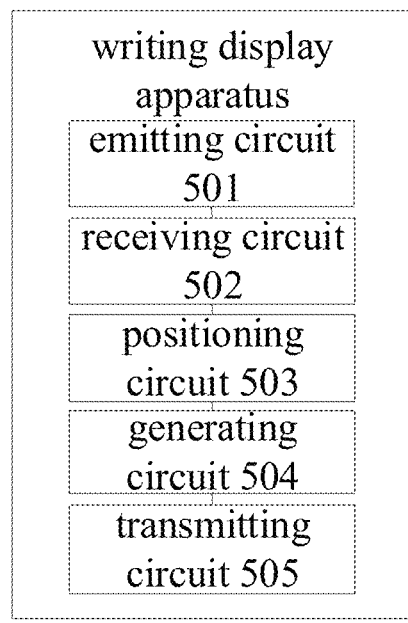
FIG. 15 is a structural diagram of the writing display apparatus as provided in embodiment 6 of the present disclosure.

FIG. 15 is a structural diagram of the writing display apparatus as provided in embodiment 6 of the present disclosure.

As shown in FIG. 15, the writing display apparatus may include an emitting circuit 501, a receiving circuit 502, a positioning circuit 503, a generating circuit 504, and a transmitting circuit 505.

In particular, the emitting circuit 501 is configured to emit a first electromagnetic signal to the electromagnetic pen, wherein the electromagnetic pen generates a power supply current based on the first electromagnetic signal and emits a second electromagnetic signal.

The receiving circuit 502 is configured to receive the second electromagnetic signal emitted from the electromagnetic pen.

The positioning circuit 503 is configured to position the electromagnetic pen based on the second electromagnetic signal to acquire an inductive position of the electromagnetic pen.

The generating circuit 504 is configured to generate, based on the inductive position of the electromagnetic pen, a moving trajectory of the electromagnetic pen on the inductive plate to acquire writing information.

The transmitting circuit 505 is configured to transmit the writing information to a display terminal.

It needs to be noted that, the explanation for the writing display method in the embodiment of FIG. 14 is also applicable for the writing display apparatus of the embodiment. The principle thereof is similar, and no further comment is given.

The writing display apparatus of the embodiment of the present disclosure emits the first electromagnetic signal to the electromagnetic pen, receives the second electromagnetic signal emitted from the electromagnetic pen, positions the electromagnetic pen based on the second electromagnetic signal to acquire the inductive position of the electromagnetic pen, and then generates, based on the inductive position of the electromagnet pen, the moving trajectory of the electromagnetic pen on the inductive plate to acquire the writing information. Thus, according to the electromagnetic induction principles, the inductive position of the electromagnetic pen may be accurately recognized such that the accuracy of acquisition of the writing information can be enhanced.

Figure 16:
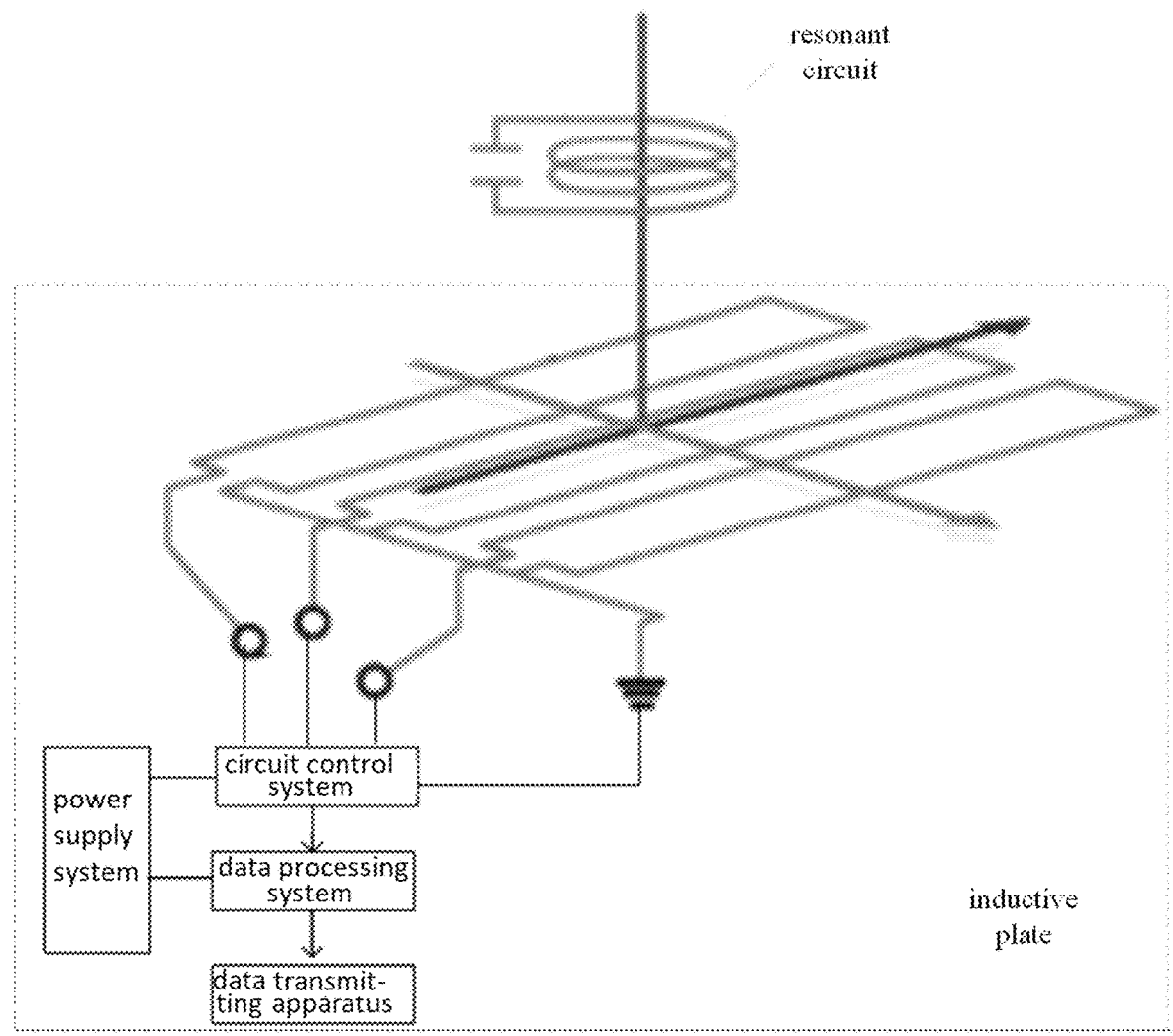
FIG. 16 is a structural diagram of the writing display system in the embodiments of the present disclosure.

As an example, referring to FIG. 16, the inductive plate may be supplied with the power by using an inside power source system, emit a first electromagnetic signal to the outside. The generated electromagnetic field may generate resonance with a resonant circuit within the electromagnetic pen 100 to convert the magnetic energy into the electric energy. Then, the electromagnetic pen 100 may be discharged to the outside by the capacitor 120 to emit the second electromagnetic signal. After the inductive plate has received the second electromagnetic signal, the coil in the inductive plate may generate an inductive current. An inside data processing system may be used to conduct data processing on the inductive current to determine an inductive position of the electromagnetic pen and generate, based on the inductive position of the electromagnetic pen, a moving trajectory of the electromagnetic pen on the inductive plate to acquire the writing information. After the data processing system acquires the writing information, the writing information may be transmitted to a display terminal (not shown) to be displayed.

To implement the aforementioned embodiments, the present disclosure further provides a computer readable storage medium.

The computer readable storage medium of the embodiment of the present disclosure, on which a computer program is stored, is characterized in that, the program, when executed by the processor, implements the writing display method as provided in the aforementioned embodiments of the present disclosure.

In the description of the present specification, the description with reference to the terms "one embodiment", "some embodiments", "example", "specific example", "some examples" or the like means specific features, structures, materials or characteristics described in connection with the embodiment or example is included in at least one embodiment or example of the application. In the present specification, the schematic representation of the above terms is not necessarily directed to the same embodiment or example. Furthermore, the particular features, structures, materials, or characteristics as described may be combined in a suitable manner in any one or more embodiments or examples. Furthermore, without contradiction, various embodiments or examples as well as features of various embodiments or examples as described in the specification may be combined by those skilled in the art.

Moreover, the terms "first" and "second" are used for descriptive purposes only and are not to be construed as indicating or implying a relative importance or implicitly indicating the number of technical features as referred. Thus, features defining with "first" or "second" may include at least one of the features, either explicitly or implicitly. In the description of the present disclosure, the meaning of "a plurality" is at least two, such as two, three or the like, unless specifically defined otherwise.

Any process or method description in the flowcharts or otherwise described herein may be understood to represent a module, segment or portion of code comprising one or more executable instructions for implementing the steps of a customized logic function or process. Moreover, the scope of the preferred embodiments of the present disclosure includes additional implementations, in which the functions may be not performed in accordance with the illustrated or discussed order, including the functions may be performed in a substantially simultaneous manner or in the reverse order depending on the functions involved. It will be understood by those skilled in the art to which the embodiments of the present disclosure pertain.

The logic and/or steps represented in the flowchart or otherwise described herein may be considered as, for example, an ordered list of executable instructions which is configured to implement logical functions and may be embodied in any computer readable medium, for the use in, or in conjunction with, an instruction execution system, apparatus, or device (eg, a computer-based system, a system including a processor, or other system that can fetch instructions and execute instructions from an instruction execution system, apparatus, or device). For the purposes of this specification, a "computer-readable medium" can be any apparatus that can contain, store, communicate, propagate, or transfer a program for use in, or in conjunction with the instruction execution system, apparatus, or device. More specific examples (non-exhaustive list) of the computer readable media include: electrical connections (electronic devices) having one or more wires, portable computer disk cartridges (magnetic devices), random access memory (RAM), Read only memory (ROM), erasable programmable read only memory (EPROM or flash memory), fiber optic devices, and portable compact disk read only memory (CDROM). In addition, the computer readable medium may even be a paper or other suitable medium on which the program can be printed, because the program may be electronically obtained by, for example, optically scanning paper or other medium, and then performing editing, interpretation or, if appropriate, performing the processings in other suitable manners, and then the program may be stored in the computer memory.

It should be understood that portions of the application can be implemented in hardware, software, firmware, or a combination thereof. In the above-described embodiments, multiple steps or methods may be implemented in software or firmware stored in a memory and executed by a suitable instruction execution system. For example, if implemented in hardware, as in another embodiment, it can be implemented by any one or combination of the following techniques well known in the art: discrete logic circuits with logic gates for implementing logic functions on data signals, application specific integrated circuits with suitable combinational logic gates, programmable gate arrays (PGAs), field programmable gate arrays (FPGAs) or the like.

Those skilled in the art can understand that all or part of the steps carried by the method of implementing the above embodiments can be completed by a program to instruct related hardware, and the program can be stored in a computer readable storage medium. When the program is executed, one or a combination of the steps of the method embodiments is included.

In addition, various functional units in various embodiments of the present disclosure may be integrated into one processing module, or each of the units may exist physically separately, or two or more of the units may be integrated into one module. The above integrated modules can be implemented in the form of hardware or in the form of software functional modules. The integrated modules, if implemented in the form of software functional modules and sold or used as stand-alone products, may also be stored in a computer readable storage medium.

The storage medium as mentioned above may be a read only memory, a magnetic disk, an optical disk or the like. While the embodiments of the present disclosure have been shown and described above, it is understood that the above-described embodiments are illustrative and are not to be construed as limiting the scope of the present disclosure. Those skilled in the art can make changes, modifications, substitutions and variations to the above-described embodiment within the scope of the present disclosure.

What is claimed is:

1. A writing display system comprising:
   an electromagnetic pen;
   an inductive plate configured to induct a moving trajectory of the electromagnetic pen on the inductive plate to acquire writing information; and
   a display terminal in communication with the inductive plate, configured to display the writing information,
   wherein the electromagnetic pen comprises a holding member and a writing member, wherein the writing member comprises a first inductive coil configured to generate a power supply current based on a first electromagnetic signal emitted by the inductive plate; and
   wherein the inductive plate comprises a core member, wherein the core member comprises:
   a second positioning coil configured to be switched by a switch in a manner of time division so as to emit the first electromagnetic signal to the first inductive coil at a first timing, receive a second electromagnetic signal emitted by the electromagnetic pen at a second timing, position the electromagnetic pen based on the second electromagnetic signal to acquire an inductive position of the electromagnetic pen, and
   a second controller connected to the second positioning coil, the second controller configured to control the second positioning coil to emit the first electromagnetic signal at the first timing and generate, based on the inductive position of the electromagnetic pen, the moving trajectory of the electromagnetic pen on the inductive plate to acquire the writing information.

2. The writing display system according to claim 1, wherein the inductive plate further comprises:
   a writable medium configured to be written, wherein the writable medium includes paper or canvas;
   wherein the core member is disposed below the writable medium;
   wherein a first substrate is disposed below the core member, and a second substrate is disposed between the core member and the writable medium.

3. The writing display system according to claim 2, wherein the writing member further comprises:
   a capacitor connected to the first inductive coil; and
   an electromagnetic signal emitter connected to the capacitor, configured to emit a second electromagnetic signal to the inductive plate after the capacitor has received the power supply current.

4. The writing display system according to claim 3, wherein the core member further comprises:
   a second coil configured to emit the first electromagnetic signal to the first inductive coil;
   a first positioning coil configured to receive a second electromagnetic signal emitted by the electromagnetic pen, and positioning the electromagnetic pen based on a second electromagnetic pen to acquire an inductive position of the electromagnetic pen;
   a first controller connected to the second coil and the first positioning coil respectively, the first controller configured to control the second coil to emit the first electromagnetic signal and generating, based on the inductive position of the electromagnetic pen, the moving trajectory of the electromagnetic pen on the inductive plate to acquire the writing information.

5. The writing display system according to claim 4, wherein the first positioning coil comprises:
   a first coil unit configured to position the electromagnetic pen in a first direction; and
   a second coil unit located on a different layer from the first coil unit, a direction of coils of the second coil unit being vertical to that of the first coil unit, the second coil unit configured to position the electromagnetic pen in a second direction.

6. The writing display system according to claim 1, wherein the second positioning coil comprises:
   a first coil unit configured to position the electromagnetic pen in a first direction; and
   a second coil unit located on a different layer from the first coil unit, a direction of coils of the second coil unit being vertical to that of the first coil unit, the second coil unit configured to position the electromagnetic pen in a second direction.

7. The writing display system according to claim 1, wherein the electromagnetic pen comprises a receiving portion configured to receive a writing medium material.

8. The writing display system according to claim 1, wherein the inductive plate establishes a communication connection with the display terminal in a wireless way.

9. A writing display method applied to an inductive plate, the writing display method comprising:
- emitting, by the inductive plate, a first electromagnetic signal to an electromagnetic pen, wherein the electromagnetic pen generates a power supply current based on the first electromagnetic signal and emits a second electromagnetic signal;
- receiving, by the inductive plate, the second electromagnetic signal emitted by the electromagnetic pen;
- positioning, by the inductive plate, the electromagnetic pen based on the second electromagnetic signal to acquire an inductive position of the electromagnetic pen;
- generating, by the inductive plate, based on the inductive position of the electromagnetic pen, a moving trajectory of the electromagnetic pen on the inductive plate to acquire writing information; and
- transmitting, by the inductive plate, the writing information to a display terminal,
- wherein the electromagnetic pen comprises a holding member and a writing member, wherein the writing member comprises a first inductive coil configured to generate the power supply current based on the first electromagnetic signal; and
- wherein the inductive plate comprises a core member, wherein the core member comprises:
- a second positioning coil configured to be switched by a switch in a manner of time division so as to emit the first electromagnetic signal to the first inductive coil at a first timing, receive the second electromagnetic signal emitted by the electromagnetic pen at a second timing, position the electromagnetic pen based on the second electromagnetic signal to acquire the inductive position of the electromagnetic pen, and
- a second controller connected to the second positioning coil, the second controller configured to control the second positioning coil to emit the first electromagnetic signal at the first timing and generate, based on the inductive position of the electromagnetic pen, the moving trajectory of the electromagnetic pen on the inductive plate to acquire the writing information.

10. A computer readable storage medium on which a computer program is stored, wherein the program, when executed by a processor, implements the writing display method applied to an inductive plate according to claim 9.

11. A writing display apparatus comprising:
- an emitting circuit configured to emit a first electromagnetic signal to an electromagnetic pen, wherein the electromagnetic pen generates a power supply current based on the first electromagnetic signal and emits a second electromagnetic signal;
- a receiving circuit configured to receive the second electromagnetic signal emitted by the electromagnetic pen;
- a positioning circuit configured to position the electromagnetic pen based on the second electromagnetic signal to acquire an inductive position of the electromagnetic pen;
- a generating circuit configured to generate, based on the inductive position of the electromagnetic pen, a moving trajectory of the electromagnetic pen on an inductive plate to acquire writing information; and
- a transmitting circuit configured to transmit the writing information to a display terminal,
- wherein the electromagnetic pen comprises a holding member and a writing member, wherein the writing member comprises a first inductive coil configured to generate the power supply current based on the first electromagnetic signal, and
- wherein the inductive plate comprises a core member, wherein the core member comprises:
- a second positioning coil configured to be switched by a switch in a manner of time division so as to emit the first electromagnetic signal to the first inductive coil at a first timing, receive the second electromagnetic signal emitted by the electromagnetic pen at a second timing, position the electromagnetic pen based on the second electromagnetic signal to acquire the inductive position of the electromagnetic pen, and
- a second controller connected to the second positioning coil, the second controller configured to control the second positioning coil to emit the first electromagnetic signal at the first timing and generate, based on the inductive position of the electromagnetic pen, the moving trajectory of the electromagnetic pen on the inductive plate to acquire the writing information.

* * * * *